Figure 1:
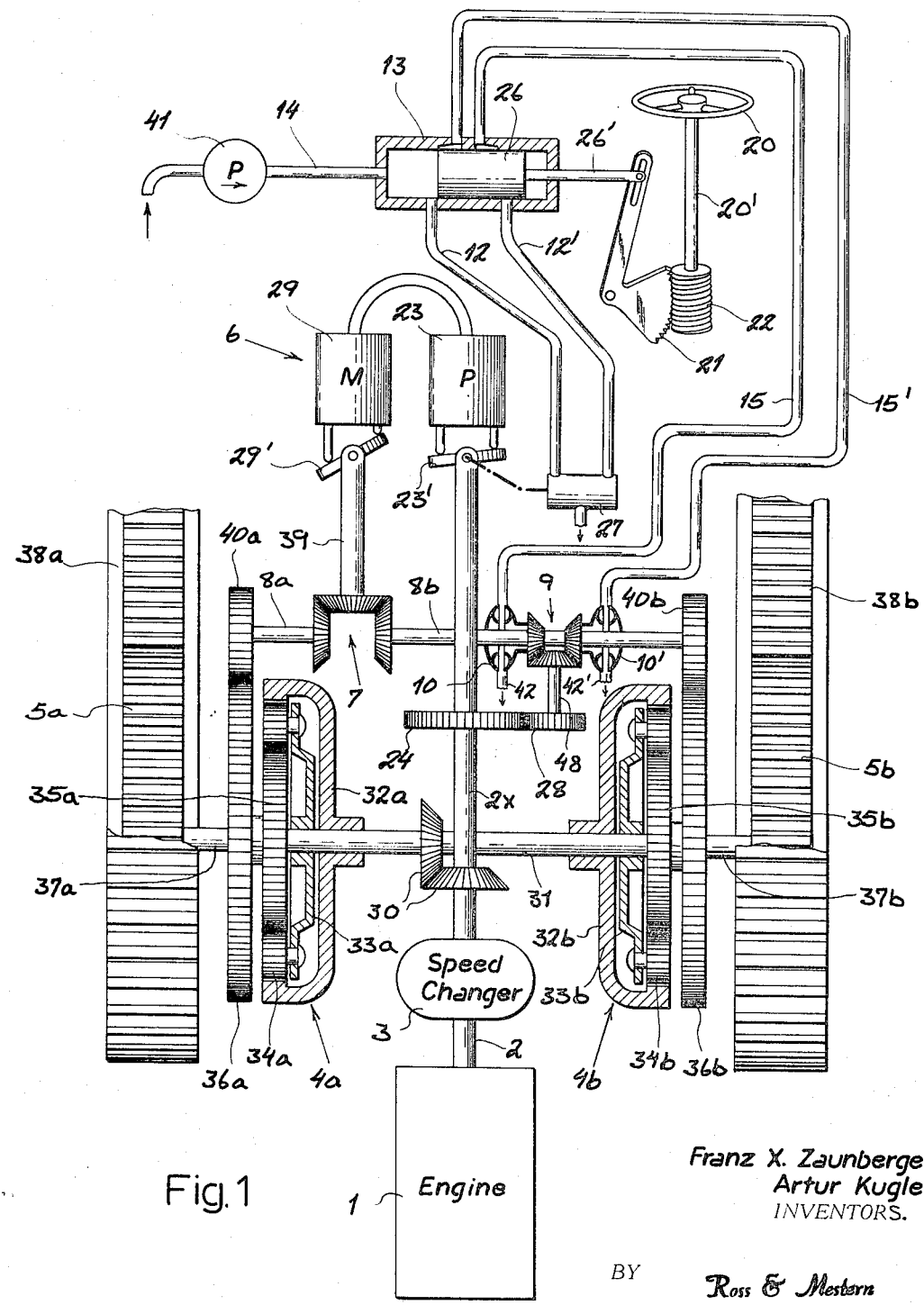

United States Patent Office 3,371,734
Patented Mar. 5, 1968

3,371,734
STEERING SYSTEM FOR ENDLESS-TRACK VEHICLES
Franz Xaver Zaunberger, Augsburg, and Artur Kugler, Hainhofen, Germany, assignors to Zahnraderfabrik Renk A.G., Augsburg, Germany, a corporation of Germany
Filed Sept. 8, 1966, Ser. No. 577,976
Claims priority, application Germany, Sept. 8, 1965, Z 11,747
8 Claims. (Cl. 180—6.44)

Our present invention relates to a steering system for a vehicle wherein a pair of endless tracks are driven from a common power shaft at relative speeds which may be selectively varied for turning the vehicle in one direction or the other.

In order to bring about the desired changes in relative speed, it is known to couple the main or power shaft with the drive shafts of the two endless tracks via respective differential gear trains and to connect a second input of each gear train with a respective control shaft, the two control shafts being differentially connected to the output of a torque generator which is controlled by the vehicular steering device and derives its power from the same main shaft as the endless tracks. For smoothness and safety of operation it is desirable that the output of this torque generator be continuously variable over a relatively wide range from zero torque to a predetermined maximum, this maximum representing the smallest turn radius (e.g., a radius of zero for rotation on the spot with the two tracks moving at like but opposite speeds (whereas zero torque corresponds to rectilinear motion. A torque generator of this continuously variable type can be a hydrostatic pump-and-motor unit, e.g., one whose pump has an adjustable swash plate linked with the steering column of the vehicle.

If the torque generator is to operate over the entire range of turning radii, it must be of strong and therefore bulky construction in order to withstand the large hydraulic pressures developed in the region of the shorter radii. The general object of our present invention is to provide means for relieving the load of this torque generator, particularly for sharp turns, so that smaller and less robust units may be used without sacrificing the continuous adjustability of the relative track speeds throughout the full range.

This object is realized, in conformity with our invention, by the provision of a servo mechanism which, under the control of the aforementioned steering device, applies to at least one of the control shafts a supplemental torque to aid the differential torque from the torque generator; this supplemental torque may be progressively applied toward the upper limit of the differential-torque range and, in fact, may come into existence only when the steering device is displaced to a predetermined minimum extent, in either direction, from its normal position corresponding to straight driving.

In order to accomplish this progressive effectiveness of the supplemental torque, the servo mechanism according to our invention advantageously operates a torque converter comprising a pair of oppositely driven slipping-clutch elements of the hydrodynamic or the mechanical friction type. The servo mechanism may progressively activate one or the other clutch element, in response to excursion of the steering device in one or the other direction, by either increasing the fluid supply in the case of a hydrodynamic coupling or augmenting the contact pressure in the case of a mechanical friction clutch.

A particular advantage of our invention is that the supplemental torque can be applied to the control shaft directly, i.e., without the interposition of a torque adder such as a further differential gear train. Thus, it is merely necessary that the speed ratio of the torque converter constituted by the slipping-clutch elements be so chosen that, for a given speed of the common power shaft, the speed imparted to the associated control shaft by the operative clutch element (in the fully activated condition of that element) lies within the rated slip range of the hydrostatic torque generator. The effect of this arrangement is that, owing to the supplemental torque supplied independently of the hydrostatic generator, the latter will not be overloaded and will operate with its normal slip.

Figure 2:
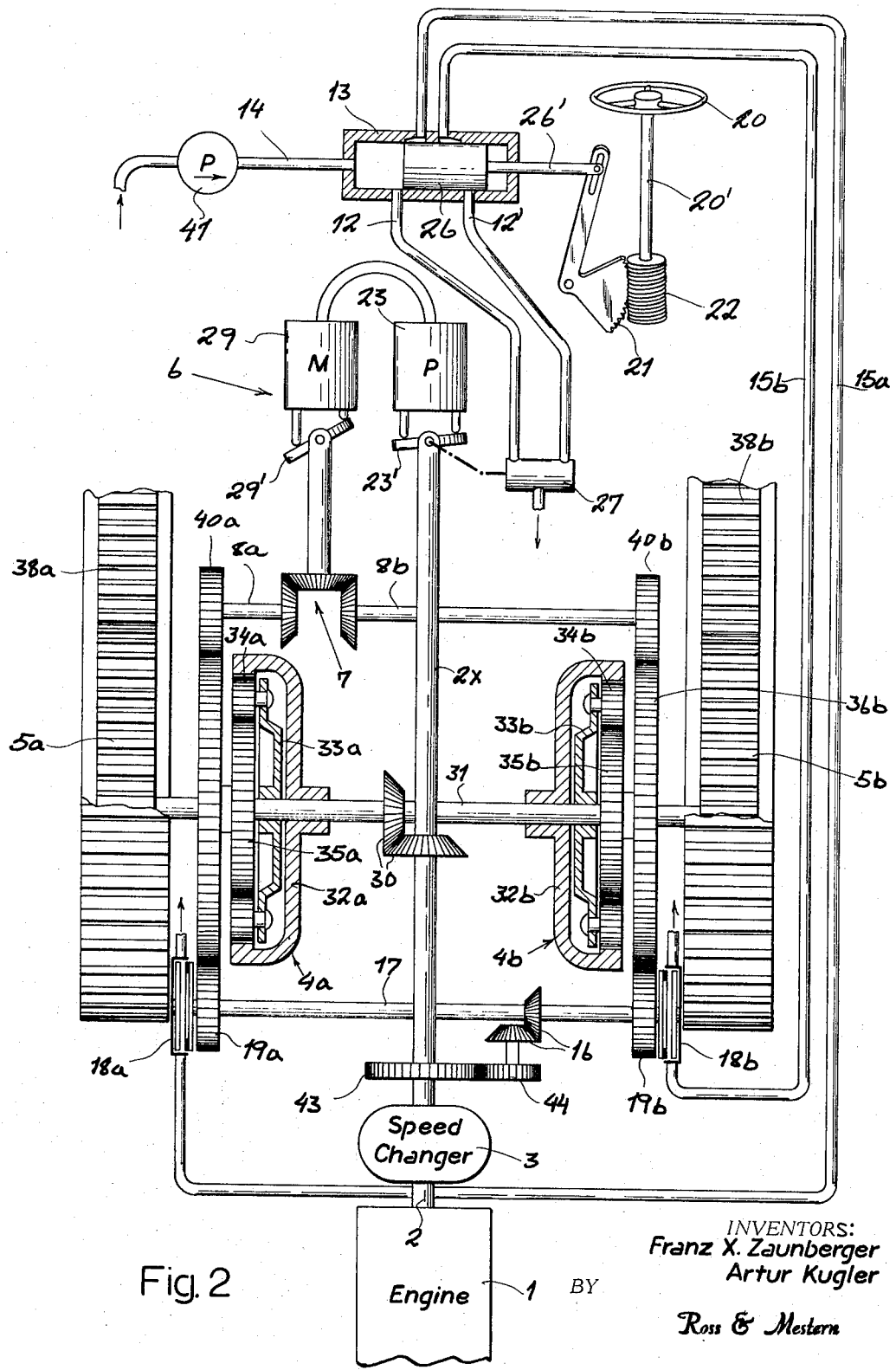

The invention will be described in greater detail with reference to the accompanying drawing in which:

FIG. 1 is a somewhat diagrammatical view of part of a vehicle equipped with endless tracks and with a steering system embodying invention; and FIG. 2 is a view similar to FIG. 1, showing a modification of the steering system.

In FIG. 1 we have shown part of a vehicle having an engine 1 with a power shaft 2 connected via a driver-operated speed changer 3, of the usual gear type, with an extension shaft 2x hereinafter referred to as the main shaft. Shaft 2x drives, through a pair of bevel gears 30, a transverse shaft 31 rigid with a pair of ring gears 32a and 32b which form part of respective differential gear trains generally designated 4a and 4b. The two differential gear trains also comprise planet carriers 33a and 33b with planetary gears 34a and 34b engaging sun gears 35a and 35b, the latter being rigid with respective spur gears 36a and 36b. A shaft 37a or 37b, positively connected with the associated planet carrier 33a or 33b, is fixed to a respective drive wheel 5a, 5b for a corresponding endless track 38a, 38b.

Shaft 2x drives a pump 23 of a conventional hydrostatic unit 6 whose swash plate 23' is adjustable by means of a hydraulic valve 27. The motor 29 of unit 6, provided with a swash plate 29', has an output shaft 39 differentially coupled, via bevel gears 7, with a pair of control shafts 8a and 8b carrying pinions 40a and 40b in mesh with the spur gears 36a and 36b, respectively. A steering wheel 20 on a column 20' is connected by a conventional linkage, here shown as a sector gear 21 and a worm 22, with a piston 26 of a hydraulic servomotor 13, the rod 26' of piston 26 being engaged by an arm 11 rigid with sector gear 21. A source of hydraulic fluid (e.g., oil) under pressure, such as a hydrodynamic pump 41, is connected by a conduit 14 with the cylinder of servomotor 13 from which two conduits 12, 12' extend to the hydraulic valve 27. Two other conduits 15 and 15' lead from the servomotor 13 to a pair of hydrodynamic torque converters 10, 10' to control their fluid supply. These torque converters have restricted outlets 42 and 42' by which the fluid is returned to a sump, and thence to the inlet of pump 41, so that the converters are drained and therefore inoperative when the associated conduits 15 and 15' are cut off from the pump 41 by the piston 26. These inlets are so shaped that, upon a predetermined minimum displacement of piston 26 to either side of its central position, one or the other inlet is exposed and admits progressively more fluid to the respective conduit upon increasing shifting of the piston toward one of its limited positions. On the other hand, the entrance ports of conduit 12 and 12' are so positioned that one or the other of them is unblocked as soon as the piston 26 moves off center.

The driving parts or impellers of the hydrodynamic torque converters 10 and 10', whose driven parts or rotors are keyed to the control shaft 8b, are differentially connected by way of bevel gears 9 to an auxiliary shaft 48 which is driven from main shaft 2x through pair of spur gears 24 and 28. Thus, the torque of shafts 2x and 47 is applied ineffectually to the torque converters 10 and 10' as long as the excursions of steering wheel 20 and, therefore, of servomotor piston 26 from their respective mid positions are insufficient to unblock the inlet of either conduit 15, 15'.

Within that limited range of steering motion, therefore, the only additional torque imposed upon the drive shafts 37a and 37b of endless tracks 38a and 38b, apart from the motive power directly supplied by the engine 1 through shaft 31, is the torque differentially applied to the control shafts 8a and 8b by the hydrostatic control unit 6 via bevel gears 7. With the piston 26 held centered, this differential torque is zero since the swash plate 23' is then in a position perpendicular to the axis of rotation of pump 23 so that control shafts 8a, 8b are held stationary along with sun gears 35a, 35b. With small displacements of the piston to one side or the other, swash plate 23' is tilted only slightly so that the hydrostatic pressure developed within the unit 6 is small. The rotation of shaft 39 due to this hydrostatic pressure turns the sun gears 35a and 35b in opposite directions so that endless wheels 37a and 37b no longer operate at the same speed and the vehicle goes into a curve. With increasing displacement of servomotor piston 26, the hydrostatic pressure rises until one of the inlets of conduits 15 and 15' begins to open and admits liquid to the respective fluid coupling 10 or 10' so that a supplemental torque is applied to control shaft 8b via bevel gears 9 in aiding relationship with the torque imposed upon that shaft via bevel gears 7. This supplemental torque decreases the pressure differential between swash plates 23' and 29' so as to reduce the load of the hydrostatic unit 6.

If this hydrostatic unit is so designed that its rated slip at full load is $p$ percent, with consequent rotation of shaft 8b at a speed $v = p \cdot r \cdot v_0 / 100$ where $v_0$ is the speed of main shaft 2x and $r$ is the transmission ratio of bevel gears 7, the transmission ratio of gears 24, 28 and bevel gears 9 should be so chosen that, taking into account the slip of fluid coupling 10 or 10' in its fully effective state, the speed of shaft 8b in the absence of unit 6 would lie within the range of $v$ to $v_0 r$.

In the modified system shown in FIG. 2, wherein elements identical with those of FIG. 1 have been designated by the same reference numerals, the hydrodynamic couplings 10 and 10' and the associated gears 9, 24 and 28 have been omitted and conduits 15 and 15' are replaced by conduits 15a and 15b leading to a pair of hydraulically operated friction clutches 18a and 18b which connect a pair of pinions 19a and 19b, respectively engaging gears 36a and 36b, with another transverse shaft 17 driven from main shaft 2x via bevel gears 16 and spur gears 43, 44. In the absence of fluid pressure in lines 15a and 15b, the friction clutches 18a and 18b are ineffectual so that the torque of shaft 17 is not transmitted to either of the differential gear trains 4a, 4b. If, however, piston 26 is shifted sufficiently to admit fluid to one or the other of these conduits, the corresponding brake 18a or 18b is progressively activated so that a supplemental torque is transmitted to the control shaft 8a or 8b via gears 19a, 36a, 40a or 19b, 36b, 40b in aiding relationship with the torque applied to that control shaft by the bevel gears 7. The same considerations as in the preceding embodiment govern the choice of the transmission ratios of gears 16, 43 and 44 as well as the tooth ratios of pinions 19a, 40a and 19b, 40b.

It will be understood that the systems herein described and illustrated may be modified in various ways with preservation of the features of novelty disclosed above. Thus, for example, friction brakes as shown at 18a and 18b, FIG. 2, may be substituted for the fluid couplings 10 and 10' of FIG. 1, or vice versa, and the three relatively movable parts (ring gears 32a and 32b, planet carriers 33a and 33b, sun gears 35a and 35b) of each differential gear train may be interchanged in their roles as input and output elements. These and other changes, readily apparent to persons skilled in the art, are therefore deemed to be embraced within the spirit and scope of our invention as defined in the appended claims.

We claim:

1. In a vehicle having a pair of endless tracks, in combination, a pair of drive shafts for said tracks; an engine; a steering device; a main shaft coupled with said engine; transmission means including a pair of differential gear trains for powering said endless tracks, each of said differential gear trains being provided with a first input connected to said main shaft, a second input, and an output connected to the respective drive shaft; two control shafts each connected to said second input of a respective differential gear train; a torque generator connected to said control shafts and responsive to said steering device for applying to said control shafts a reversible differential torque continuously variable in a range between zero and a predetermined maximum; a servo mechanism under the control of said steering device; and additional drive means responsive to said servo mechanism for applying to one of said control shafts a supplemental torque aiding said differential torque at least in the upper region of said range.

2. The combination defined in claim 1 wherein additional drive means comprises a torque converter, said torque generator and said torque converter each having an input connected to said main shaft for actuation thereby.

3. The combination defined in claim 2 wherein said torque generator comprises a hydrostatic pump-and-motor unit.

4. The combination defined in claim 3 wherein said torque converter has a torque ratio so chosen that the rotary speed of said one of said control shafts due to said supplemental torque lies within the rated slip range of said hydrostatic unit.

5. The combination defined in claim 2 wherein said torque converter comprises a pair of normally inactive slipping-clutch elements connected to impart opposite rotation to said one of said control shafts, said elements being coupled with said servo mechanism for alternate activation upon excursions of said steering device in respective directions from a normal position.

6. The combination defined in claim 5 wherein said clutch elements are hydrodynamic drive units.

7. The combination defined in claim 5 wherein said clutch elements are friction clutches.

8. The combination defined in claim 1, further comprising speed-changing gear means interposed between said engine and said input shaft.

References Cited

UNITED STATES PATENTS

| | | | |
|---|---|---|---|
| 2,352,483 | 6/1944 | Jandasek | 180—6.44 |
| 2,392,729 | 1/1946 | Edge | 180—6.44 |
| 2,580,946 | 1/1952 | Orshansky et al. | 74—687 |
| 3,250,151 | 5/1966 | Binger | 74—720.5 |

BENJAMIN HERSH, *Primary Examiner.*

L. D. MORRIS, *Assistant Examiner.*